United States Patent

Terao et al.

[11] 3,919,207
[45] Nov. 11, 1975

[54] INTERMEDIATES FOR PRODUCING CEPHALOSPORINS

[75] Inventors: Shinji Terao, Toyonaka; Taisuke Matsuo; Susumu Tsushima, both of Suita; Toshio Miyawaki, Nishinomiya; Norichika Matsumoto, Neyagawa, all of Japan

[73] Assignee: Takeda Chemical Co., Ltd., Japan

[22] Filed: Sept. 12, 1972

[21] Appl. No.: 288,343

[30] Foreign Application Priority Data
Sept. 13, 1971  Japan.............................. 46-71086
June 6, 1972  Japan.............................. 47-56235

[52] U.S. Cl............................ 260/243 C; 424/246
[51] Int. Cl.² ............C07D 501/18; C07D 501/02; A61K 31/545
[58] Field of Search ............................ 260/243 C

[56] References Cited
UNITED STATES PATENTS

| | | | |
|---|---|---|---|
| 3,234,222 | 2/1966 | Fechtig et al. ................ | 260/243 C |
| 3,575,970 | 4/1971 | Weissenburger et al........ | 260/243 C |
| 3,632,578 | 1/1972 | Chauvette ..................... | 260/243 C |

*Primary Examiner*—R. Gallagher
*Assistant Examiner*—Diana G. Rivers
*Attorney, Agent, or Firm*—Wenderoth, Lind & Ponack

[57] ABSTRACT

The present invention relates to novel intermediates and a process for producing a compound of formula:

$$R^4-NHA$$

wherein $R^4$ is acetyl substituted by one or two phenyl, cyclohexenyl, thienyl, pyridylthio, amino or sulfo groups wherein the amino is unprotected or protected with hydrochloric acid, isobornyloxycarbonyl, β-methylsulfonylethoxycarbonyl, benzoyl or nitrobenzoyl groups, and A represents a cephalosporin moiety of the formula

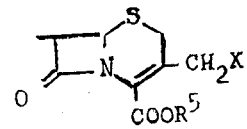

wherein X is hydrogen or acetoxy and $R^5$ is β-methylsulfonylethyl, trimethylsilyl, methoxymethyl or p-nitrobenzyl, which comprises reacting a compound of the formula:

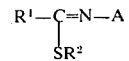

wherein $R^1$ is benzyl or phenoxymethyl, $R^2$ is alkyl and A has the same meaning as above, with a compound of the formula:

$$R^6-W$$

wherein $R^6$ is an acetyl group as defined above and W is chloride, bromide, $SO_3$, $NO_3$ or p-toluenesulfonyl, in a solvent at pH below 8.0.

5 Claims, No Drawings

INTERMEDIATES FOR PRODUCING CEPHALOSPORINS

The present invention relates to a novel process for producing antibiotics, especially cephalosporin compounds.

Attempts for obtaining antibiotics by a chemical modification of cephalosporin compounds have heretofore been chiefly made through a transacylation of these compounds. The removal and introduction of acyl groups are very important fundamental reactions in the chemistry of cephalosporin compounds. In the conventional methods for the removal or introduction of acyl groups, the following steps are followed. Namely, cephalosporin C or 7-acyl-3-desacetoxycephalosporanic acids, the former being obtainable by the fermentation of a microorganism and the latter being obtainable by the ring transformation reaction of penicillin sulfoxides, are first chemically de-acylated to, for instance, 7-aminocephalosporanic acid (hereinafter referred to as "7-ACA") or 7-amino3-desacetoxycephalosporanic acid (hereinafter referred to as "7-ADCA"), and these deacylated products are subsequently acylated. However, these processes are not commercially advantageous, for they not only involve many reaction steps but the de-acylating reaction must be carried out at a extremely low temperature of, say, -40°C. It is also known that although the cephalosporin compounds may be obtained by direct acylation of iminoether derivatives of cephalosporin C, etc., this process cannot be carried out at such a low temperature as above without sacrificing a high yield of the objective compounds.

The present inventors have now discovered a novel process for producing cephalosporin compounds, which may be carried out at a higher temperature than 0°C without employment of a 7-aminocephalosporanic acid derivative as an intermediate.

Thus, the present process comprises a step in which an acylamino compound of the general formula:

$$R^1CONH-A \qquad (I)$$

wherein $R^1$ is a group capable of forming an acyl group with a carbonyl group and A represents a cephalosporin moiety derived by deleting the 7-acylamino group, is iminothiolated to obtain an active sulfur-containing compound of the general formula:

$$R^1-C=N-A \atop SR_2 \qquad (II)$$

wherein $R^2$ is a hydrogen atom or an alkyl or acyl group and the other symbols have the same meanings as defined above, which is generally relatively stable and can be isolated in crystalline form, and a step in which a compound (II) is reacted with a compound representable by the general formula:

$$R^6-W \qquad (VI)$$

wherein $R^6$ is hydrogen or an acyl group and W is an acid residue to give a cephalosporin compound of the general formula:

$$R^4-NHA \qquad (III)$$

wherein $R^4$ is hydrogen or an acyl group and A has the same meaning as above. As regards the acylamino compounds (I) which can be employed as starting materials in this invention, those which can be easily produced by fermentation or those which can be easily derived from such fermentation products may be utilized to particular advantage. Therefore, the acyl group $R^1CO$ is exemplified by phenoxyacetyl, phenylacetyl, 5-amino-5-carboxyvaleryl or its 5-acylamino derivative. Of course, any other suitable acyl group, e.g. thienylacetyl, may also be useful. The cephalosporin moiety, as designated A herein, may be the one obtainable upon removal of the 7-acylamino group from the cephalosporin compound. The substituent at the 3-position of a cephalosporin compound may be acetoxymethyl group or a group derived by converting the acetoxy group of said acetoxymethyl group to hydrogen, an alkoxy group such as methoxy, an alkylthio group such as methylthio, or an acyloxy group such as propionyloxy, a tertiary ammonium group such as pyridinium, pyridazinium, etc. Further, the carboxyl group in 4-position may be in the form of an easily removable ester. In the case of such ester, the ester residue may for example be methyl, ethyl, tert-butyl, tert-amyl, benzyl, p-nitrobenzyl, p-methoxybenzyl, benzhydryl, 1-indanyl, phenacyl, phenyl, p-nitrophenyl, methoxymethyl, ethoxymethyl, benzyloxymethyl, acetoxymethyl, pivaloyloxymethyl, β-methylsulfonylethyl, methylthiomethyl, trityl, trimethylsilyl, dimethylsilyl, 2,2,2-trichloroethyl, diphenylmethyl, p-methoxybenzyl, triphenylmethyl, bis-(p-methoxyphenyl)methyl, 3,5-di-tert-butyl-4-hydroxybenzyl, etc. Thus, the symbol A, the cephalosporin moiety, may be represented by the general formula:

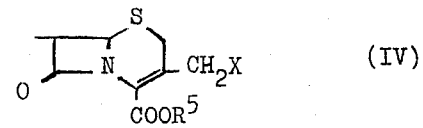

wherein X is hydrogen, acetoxy group, etc., and $R^5$ is an easily removable ester residue. Among such acylamino compounds (I), an ester of cephalosporin C, N-substituted cephalosporin C, 7-phenylacetamido-3-desacetoxycephalosporanic acid, 7-phenoxyacetyl-3-desacetoxycephalosporanic acid and the like are preferably used.

According to this invention, such an acylamino compound (I) is subjected to an iminothiolation reaction to obtain an active sulfur containing compound (II). This iminothiolation reaction is such that the -CONH group in the acylamide group is converted to an iminothioether group which is either substituted with an alkyl group or unsubstituted. This reaction is carried out by the following steps. Namely, the acylamino compound (I) is reacted with a sulfurizing agent such as phosphorus pentasulfide or, alternatively, reacted with a halogenating agent such as phosphorus pentachloride to obtain the corresponding iminohalide which is then reacted with a sulfur compound such as hydrogen sulfide, thioalcohol, thiocarboxylic acid, thioacetamide or a phosphorous compound of the formula:

wherein $R^8$ and $R^9$ respectively represent an alkoxy, aryloxy or dialkylamino group, and, when $R^2$ is hydrogen, the product may be further reacted with an alkylating agent or an acylating agent.

The reaction of acylamino compound (I) with a sulfurizing agent such as phosphorus pentasulfide is carried out in a solvent such as dichloromethane, chloroform, benzene, xylene, dioxane, ethyl acetate or carbon disulfide. This reaction is preferably conducted in the presence of a base, for example, pyridine, quinoline or N,N-dimethylaniline, generally at room temperature or under cooling with ice. The halogenating agent which is employed in the formation of the iminohalide compound may, for example, be phosphorus oxychloride, phosphorus pentachloride, phosphorus trichloride or thionyl chloride. The reaction leading to an iminohalide is generally conducted advantageously in a solvent such as chloroform or dichloromethane. This reaction is preferably carried out in the concomitant presence of an organic base such as pyridine, quinoline, N,N-dimethylaniline, triethylamine or N-methylmorpholine. As the proportion of said base, it is sufficient to add 2 to 3 equivalents of the base relative to the halogenating agent. Relative to the acylamino compound (I), generally 1 to 2 equivalents of a halogenating agent is employed. This reaction leading to the formation of an iminohalide is generally conducted at a temperature of about $-10°C$ to about $30°C$ and it is advantageous to ajust so that the reaction goes to completion generally in about 15 to 120 minutes.

Subsequently, to the thus-obtained reaction mixture containing the iminohalide compound is added a sulfur compound such as hydrogen sulfide, sodium sulfide, sodium hydrosulfide, methyl mercaptane and sodium methyl thioalcoholate, thioacetic acid, potassium thioacetate, thioacetamide, or a phosphorous compound (V) such as dimethyl dithiophosphate, diethyl dithiophosphate, etc. The reaction with the sulfur compound proceeds within the above-mentioned temperature range to give the active sulfur-containing compound (II) in good yield. In adding the sulfur compound to the iminohalide compound, it is desirable to add simultaneously an acid acceptor such as an organic base, as mentioned above. Among such active sulfur-containing compounds (II), the one in which $R^2$ is a hydrogen atom is a thione type, i.e. thionamide type compound as seen from its infrared absorption and nuclear magnetic resonance spectra. The active sulfur-containing compound (II) wherein $R^2$ is a hydrogen atom may be converted to the substituted iminothioether derivative by reaction with an alkylating agent such as methyl iodide, dimethyl sulfate or ethyl bromide. In carrying out this reaction, it is preferable to employ an acid acceptor such as an inorganic base, for example sodium carbonate, potassium carbonate, sodium hydrogen carbonate or potassium hydrogen carbonate, or an organic base as mentioned above. The sulfur-containing compound (II) thus obtained can be recovered in pure and stable form by means of the routine separation and purification procedures.

In most cases, the sulfur-containing compound (II) can be isolated in crystalline form and remain stable in an aqueous medium above pH 4.0. When suitable amount of hydrogen chloride and pyridine co-exists in the reaction system, the sulfur-containing compound (II) precipitates as an adduct consisting the sulfur-containing compound (II), hydrogen chloride and pyridine (1:1:1). Incidentally, the isolation and purification of the sulfur-containing compound (II) is not always essential. In a sequential process, the reaction mixture may be directly subjected to the reaction with a compound (VI).

Thus obtained active sulfur-containing compound (II) can be converted to a cephalosporin derivative (III) by the reaction with a compound (VI). In the compound (VI), the acyl group represented by symbol $R^6$ may be any of those derived from organic carboxylic acid preferably having up to 12 carbon atoms. The acyl groups may be preferably acetyl groups substituted with phenyl, phenoxy, thienyl or cyclohexenyl group in the α-position. Additionally the acetyl group may have in the α-position an amino, carboxy or sulfo group or a group derived therefrom. Among such acyl groups, there are exemplified ones derived from phenylglycine, phenylmalonic acid, phenylacetic acid, p-nitrophenylacetic acid, 1-cyclohexenyglycine, trimethylcyclohexylglycine, thienylacetic acid, pyridylthioacetic acid, phenoxyacetic acid, αphenoxypropionic acid, α-phenoxybutyric acid, α-sulfophenylacetic acid, α-naphthylacetic acid, 2,6-dimethoxybenzoic acid, 5-methyl-3-phenyl-4-isoxazolylcarboxylic acid, 3-0-chlorophenyl-5-methyl-4-isoxazolylcarboxylic acid, dimethyloxophenylimidazolidinylcarboxylic acid, 4-(N-methylpyridinium)-thioacetic acid, etc.

When an amino group is contained in any of the acyl groups, the amino group may be protected with hydrochloric acid or such a group as methoxycarbonyl, benzyloxycarbonyl, t-butoxycarbonyl, isobornyloxycarbonyl, β-methylsulfonylethoxycarbonyl, benzoyl, nitrobenzoyl. Where there are two or more carboxyl groups, such carboxyl groups may be protected with a suitable protective group such as β-methylsulfonylethyl, trimethylsilyl or p-nitrobenzyl, for instance. The acid residue symboled W may be a halogen such as chlorine or bromine, $SO_4$, $NO_3$ or an organic sulfo group such as p-toluenesulfonyl group.

When an organic carboxylic acid is used in this reaction, it may be employed in a form of the free acid, the corresponding salt with sodium, potassium, calcium, trimethylamine or pyridine or the corresponding acid halide, acid anhydride, mixed acid anhydride, active amide, ester or other reactive derivative. The commonest derivatives include acid chloride, alkyl carbonic anhydride, an aliphatic carboxylic acid mixed anhydride, acid azolide and the like. When said organic carboxylic acid is used as a free acid or a salt, a suitable condensing agent is employed. Among useful condensing agents are N,N'-di-substituted carbodiimides such as N,N'-dicyclohexylcarbodiimide; azolides such as N,N'-carbonylimidazole, N,N'-thionyldiimidazole, etc.: and such dehydrating agents as N-ethoxycarbonyl-2-ethoxy-1,2-dihydroquinoline, phosphorus oxychloride, alkoxyacetylene and the like. When such a condensing agent is employed, the reaction presumably proceeds via a reactive derivative of the carboxylic acid.

This reaction can generally be conducted smoothly in the presence of a solvent. The solvent may be any common solvent that will not adversely affect the reaction, such as water, acetone, tetrahydrofuran, dioxane, acetonitrile, chloroform, dichloromethane, dichloroethane, pyridine, dimethylaniline, dimethylformamide, dimethylacetamide, dimethylsulfoxide, etc. or a mixture of such solvents. While the reaction temperature is virtually optional, the reaction is generally carried out under cooling or at room temperature, preferably above 0°C. The pH of the reaction system is preferably below 8.0 and a buffer solution may be employed, if desired. The reaction in an aqueous solvent proceeds efficiently, irrespective of whether it takes place in a bilayer condition or in a homogeneous solution.

This reaction is preferably carried out in the presence of a hydroxyl compound of the formula:

$$R^7 OH \qquad (VII)$$

wherein $R^7$ is hydrogen, an alkyl group such as methyl, ethyl, propyl, amyl, etc. or an acyl group such as acetyl, etc. The hydroxyl compound also may be employed as a solvent. From the reaction product, the transacylated cephalosporin compound (III) can be isolated and purified by a conventional procedure, such as column chromatography on silica gel, the use of an ion exchange resin or fractional crystallization, for instance.

Of the cephalosporin compound (III) thus obtained, the protecting part of the carboxyl and amino groups may, if necessary, be removed by appropriate means, e.g. solvolysis, acid or alkali hydrolysis, catalytic reduction or zinc-acetic acid reduction. When the sulfur-containing compound (II) is reacted with the compound (VI) wherein $R^6$ is hydrogen, 7-amino compound is obtained. In this case, the presence of the hydroxyl compound (VII) is necessary. Generally, the reaction rapidly proceeds at room temperature. When the amino compound contains an ester residue, the residue may be removed as required by taking advantage of the abovedescribed de-esterification procedure.

Thus, it become possible to produce antibiotics which are superior to the starting cephalosporins. It is also possible, by the present method, to manufacture 7-aminocephalosporanic acid, 7-amino-3-desacetoxycephalosporanic acid, etc., all of which are important intermediates for the production of cephalosporins, at reduced costs.

The NMR spectra in the examples to be given hereinafter were obtained using a Varian T 60 or a HA 100 spectrometer, with tetramethylsilane as an internal reference. The δ values were expressed in p.p.m. Unless otherwise specified, deuteriochloroform was used as the solvent. The symbol s signifies a singlet, d a doublet, t a triplet, q a quartet, m a multiplet and J a coupling constant in Hz.

It is to be understood that the following examples are solely for the purpose of illustration and not to be construed as limitations of this invention, and that many variations may be resorted to without departing from the spirit and scope of this invention. In this specification, "g.", "mg.", "ml.," "m.p." and "decomp." are "gram", "milligram", "milliliter," "melting point" and "decomposed," respectively. Temperatures are all uncorrected, and percentages are all on the weight basis.
I. Preparation of the iminothioether compounds.

EXAMPLE I-1

1. In dichloromethane (500 ml.) are dissolved 7-phenylacetamido-3-desacetoxycephalosporanic acid methyl ester (13.84 g.) and pyridine (3.16 g.), followed by the addition of phosphorus pentasulfide (20 g.). The mixture is stirred at room temperature for 7 hours. The excess phosphorus pentasulfide is decomposed by the addition of water (200 ml.) and, then, the organic layer is washed with 3 percent aqueous solution of sodium hydrogen carbonate and water, dried and concentrated.

The concentrate is passed through a column of silica gel, with a mixture of ether-chloroform (1:4). The eluate is concentrated, to which is added ether whereby crystals of 7-phenylthionacetamido-3-desacetoxycephalosporanic acid methyl ester (10.5 g.) are obtained. M. P. 172°–174°C.
Elementary analysis:
Calculated for $C_{17}H_{18}N_2S_2O_3$: C 56.35; H, 5.01; N, 7.73 (%)
Found C 56.26; H, 4.92; N, 7.75 (%)
IR(KBr disc): 1762, 1723, 1546cm$^{-1}$
NMR(100 MHz): 2.12(3H, s), 3.23(2H, q(AB pattern), J=17),
3.75(3H, s), 4.09(2H, s), 4.99(1H, d, J=5), 5.93(1H, q, J=5,8), 7.27(5H), 8.34(1H, d, J=8)
UV$\lambda^{EtOH}_{max}$ 272mμ( =15100)

2. 7-Phenylthionacetamido-3-desacetoxycephalosporanic acid methyl ester (18.1 g.), sodium carbonate (10.6 g.) and methyl iodide (35 ml.) are added to a mixture of acetone (250 ml.) and water (100 ml.) and the entire mixture is stirred at room temperature for 5 hours. The solvent is distilled off under reduced pressure and the residue is extracted with dichloromethane. The extract is washed with water and dried over sodium sulfate. The solvent is then distilled off and the residue is recrystallized from dichloromethane-ether (1:4) to yield 14.5 g. of 7-(α-methylthiophenethylidene)-amino-3-desacetoxycephalosporanic acid methyl ester. The mother liquor is concentrated to recover an additional product (2.3 g.). Needles. M.P. 130°–132°C.
Elementary analysis:
Calculated for $C_{18}H_{20}N_2S_2O_3$: C, 57.42; H, 5.35; N, 7.44; S, 17.03 (%)
Found C, 57.49; H. 5.35; N, 7.64; S, 16.85 (%)
IR(KBr disc): 1774, 1725, 1595cm$^{-1}$
NMR(100MHz): 2.11(3H, s), 2.32(3H, s), 3.32(2H, q(A-B Pattern),
J=18), 3.83(3H, S), 3.96(2H, q(A-B pattern), J=15), 4.92(1H, d, J=5), 5.35(1H, d, J=5), 7.26(5H).
UV:$\lambda^{EtOH}_{max}$ 247.5mμ($\epsilon$= 14400)

EXAMPLE I-2

1. To a suspension of penicillin sulfoxide (35 g.) and pyridine (9.0 g.) in anhydrous dichloromethane (250 ml.) is added a solution of β-methylsulfonylethylchloroformate (20 g.) in dichloromethane (100 ml.) dropwide at room temperature under stirring. Carbon dioxide is rapidly evolved during the addition of the chloroformate. After the addition, the reaction mixture is washed with a 1 percent aqueous solution (100 ml.) of hydrogen chloride and twice with water, dried over sodium sulfate, filtered, and evaporated under reduced pressure. The residue is crystallized from ethylacetate to give penicillin G sulfoxide β-methylsulfonylethylester (41.2 g.), mp.140°–141°C.

Penicillin G sulfoxide β-methylsulfonyl ethylester 930 g.) and β,β,β-trichloroethylphosphate (1.2 g.) are suspended in a mixture of toluene (300 ml.) and secondary butylalcohol (100 ml.). The mixture is refluxed for 8 hours under nitrogen atmosphere. The resulting mixture is evaporated to dryness under reduced pressure. The residue is crystallized from methanol to afford 7-phenylacetamido-3-desacetoxycephalosporanic acid β-methylsulfonyl ethylester (14.6 g.).M.P. 158°C.

2. 7-Phenylacetamido-3-desacetoxycephalosporanic acid β-methylsulfonylethyl ester (13 g.) and pyridine (2.4 g.) are dissolved in dichloromethane (150 ml.). At room temperature, phosphorus pentasulfide (15 g.) is added to the solution and the mixture is stirred for 5 hours.

The insolubles are filtered off and the solution is washed with water, dried and concentrated. The concentrate is chromatographed on silica gel by eluting with a mixture of dichloromethane and ether (1:4) to afford 7-phenylthionacetamido-3-desacetoxycehalosporanic acid β-methylsulfonylethyl ester (9.2 g.). Pale yellow needles (recrystallized from ethylalcohol). M.P. 142°–144°C.

Elementary analysis: Calculated for $C_{19}H_{22}O_5N_2S_3$: C, 50.20; H, 4.88; N, 6.16; S, 21.16(%)

Found C, 50.15; H, 4.88; N, 6.39; S, 21.38(%)

IR(KBr disc): 3300, 1772, 1730cm$^{-1}$

NMR(100MHz, d$_6$-DMSO): 2.10(3H, s), 3.02(3H, s), 3.25–3.69

(4H, m), 4.02(2H, q (AB-pattern) J=14), 4.54(2H, t, J=6), 5.15(1H, d, J=4), 5.93(1H, q, J=4,6), 7.17–7.41 (5H, m), 11.10(1H, d, J=6)

EXAMPLE I-3

7-Phenylacetamido-3-desacetoxycephalosporanic acid methoxymethyl ester (720 mg.) and pyridine (160 mg.) are dissolved in dichloromethane (20 ml.). Then, under stirring and cooling with ice, phosphorus pentasulfide (1.1 g.) is added to the solution and the mixture is stirred for 20 hours. The insolubles are filtered off and the filtrate is concentrated to dryness under reduced pressure. The residue is chromatographed on silica gel by eluting with a mixture of dichloromethane and ether (1:4) to give 7-phenylthionacetamido-3-desacetoxycephalosporanic acid methoxymethyl ester. Yield 450 mg. (recrystallized from methylene chloride-ether). M.P.133°–135°C; IR(KBr disc): 1758,1721, 1545cm$^{-1}$.

EXAMPLE I-4

1. Phosphorous pentachloride (2.5 g.) is suspended in dichloromethane (35 ml), followed by the addition of pyridine (1.6 g.). The mixture is cooled to −10°C and 7-phenylacetamido-3-desacetoxycephalosporanic acid methyl ester (3.46 g.) is added. The mixture is stirred at −10°C for 2 hours.

After the addition of pyridine (2.4 g.) to the reaction mixture at the same temperature, hydrogen sulfide is bubbled through the solution at −10°– −5°C for 30 minutes. The resulting mixture is further stirred for 30 minutes, and then an aqueous solution (50 ml.) of sodium hydrogen carbonate (1.68 g.) is added dropwise. The mixture is extracted with dichloromethane (50 ml.) three times and the extracts are pooled, washed with water, dried and concentrated. The concentrate is purified by chromatography on silica gel and the product is recrystallized from ether. The procedure yields crystals (2.93 g.) of 7-phenylthioacetamido-3-desacetoxycephalosporanic acid methyl ester (2.93 g.).

In IR and NMR spectra, the above product is in complete agreement with the product obtained in Example I-1, (1).

2. 7-Phenylthionacetamido-3-desacetoxycephalosporanic acid methyl ester (181 mg.) and sodium carbonate (106 mg.) are added to a mixture of acetone (4 ml.) and water (1 ml.), followed by the addition of dimethyl sulfate (100 mg.). The mixture is stirred at room temperature for 4 hours and the insolubles are filtered off. The filtrate is concentrated to dryness under reduced pressure and the residue is extracted with dichloromethane. After dried, dichloromethane is removed and ether is added, whereupon 7-(α-methylthiophenethylidene)-amino-3-desacetoxycephalosporanic acid methyl ester is obtained. In IR spectrum, this product is in complete agreement with the product obtained in Example I-1-(2).

EXAMPLE I-5

Phosphorus pentachloride (6.5 g.) is suspended in dichloromethane (45 ml.), followed by the addition of pyridine (12 g.). The mixture is cooled to −10°C and 7-phenylacetamido-3-desacetoxycephalosporanic acid β-methyl-sulfonylethyl ester (4.38 g.) is added. After the mixture is stirred for 2 hours at the same temperature, hydrogen sulfide is bubbled through the mixxture at −5° to −10°C for 3 hours.

The dichloromethane solution is poured into ice-water, and the organic layer is washed with water, dried and concentrated. The procedure yields 7-phenylthioacenotamide-3-desacetoxycephalosporanic acid β-methylsulfonylethyl ester (4.26 g.). In IR and NMR spectra, the above product is in agreement with the product obtained in Example I-2.

EXAMPLE I-6

Phosphorus pentachloride (2.5 g.) is suspended in dichloromethane (30 ml.), followed by the addition of pyridine (1.6 g.). The suspension is cooled to −10°C, to which is added 7-phenylacetamido-3-desacetoxycephalosporanic acid methyl ester (3.46 g.), followed by stirring for 2 hours at the same temperature. An additional amount (2.4 g.) of pyridine is added to the mixture and methyl mercaptan is passed through the mixture in the neighborhood of 0°C. The mixture is allowed to stand at room temperature for 12 hours, and then it is poured into a 3 percent aqueous solution of sodium hydrogen carbonate (200 ml.). The organic layer is washed with water, dried over sodium sulfate and concentrated. The concentrated is purified by chromatography on silica gel to obtain 7-(α-methylthioiphenylidene)amino-3-desacetoxycephalaosporanic acid methyl ester. In IR spectrum, this product coincides with the product according to Example I-4, (2).

EXAMPLE I-7

7-Phenylthioacetamido-3-desacetoxycephalosporanic acid β-methylsulfonylethyl ester (2.27 g.). sodium carbonate (1.06 g.) and methyl iodide (5 ml.) are dissolved in a mixture of acetone (30 ml.) and water (5 ml.) and the solution is stirred at room temperature for 5 hours. The solvent is distilled off and the residue is extracted with dichloromethane. The extract is dried and concentrated to obtain 7-(α-methylthiophenyldiene)amino-3-desacetoxycephalosporanic acid β-methylsulfonylethyl ester (2.2 g.). Amorphous.
IR(KBr disc): 1770, 1729, 1616cm$^{-1}$
NMR(100MHz): 2.11(3H, s), 2.31(3H, s), 2.92(3H, s), 3.30(2H,
q(A-B pattern), J=18), 3.39H, m), 3.94(2H, q(A-B pattern), J=16), 4.64(2H, m), 4.91(1H, d, J=5), 5.30 (1H, d, J=5), 7.26(5H).

EXAMPLE I–8

1. Sodium 7-(2-Thienylacetamido)-cephalosporanate (5g.) is suspended in N,N-dimethylformamide (50 ml.) under stirring and cooling with ice, and then chloromethyl methyl ether (1.16 g.) is gradually added dropwise. The mixture is further stirred for 3 hours. The reaction mixture is poured into water (100 ml.) and the crystals formed thereupon are extracted thrice with 30 ml. each portion of dichloromethane. The combined extract is washed with a 3% aqueous solution of sodium hydrogen carbonate and water in the order mentioned, dried and concentrated to yield 7-(2-thienylacetamido)-cephalosporanic acid methoxymethyl ester. Recrystallization from ether gives 4.4 g. of crystals (85.2%). M.P.164°–164°C.
IR(KBr disc): 3275, 1785, 1750, 1722, 1650, 1535cm$^{-1}$ NMR(60MHz) (d$_6$-DMSO): 2.00(3H, s), 3.41(3H, s), 3.60(2H, s) 3.75(2H, s), 4.88(2H, q, J=14), 5.1091H, d, J=5), 5.35(2H, s), 5.74
(1H, q, J=5), 6.91(2H, m), 7.30(1H, m), 9.10(1H, d, J=8).

(2) Phosphorus pentachloride (2.5 g.) is suspended in dichloromethane (45 ml.), followed by the addition of pyridine (1.6 g.). The suspension is cooled to −10°C, to which is added 7-(2-thienylacetamido)cephalosporanic acid methoxymethyl ester (4.40 g.). The mixture is stirred at −10°C for 2 hours, to which is then added pyridine (2.4 g.). Hydrogen sulfide is bubbled through the mixture at 0° to −10°C for 3 hours and, then, an aqueous solution (50 ml.) of sodium hydrogen carbonate (1.68 g.) is added dropwise. The aqueous layer is extracted twice with 30 ml. each portion of dichloromethane and the combined extract is washed with water, dried and concentrated. The concentrate is purified by chromatography on silica gel to obtain 7-(2-thienylthionacetamido)cephalosporanic acid methoxymethyl ester (2.8 g.). Amorphous.
IR(KBr disc, wet method): 3597, 1785, 1735cm$^{-1}$.
NMR(100 MHz): 2.05(3H, s), 3.40(2H, d, J=9), 3.48(3H, s),
4.29(2H, s), 4.94(2H, q, J=14), 5.04(1H, d, J=6), 5.33(2H, s), 6.10(1H, q, J=6), 6.90–7.27(3H, m), 8.10 (1H, d, J=8).

EXAMPLE I–9

In dichloromethane (15 ml.) are dissolved 7-(2-thienylacetamido)-cephalosporanic acid methoxymethyl ester (645 mg.) obtained in Example I-8, (1) and pyridine (120 mg.), followed by the addition of phosphorus pentasulfide (1.5 g.). The mixture is stirred at room temperature for 1 hour. The insolubles are filtered off and the filtrate is concentrated under reduced pressure. The residue is purified by chromatography on silica gel, whereupon 7-(2-thienylthioacetamido)-cephalosporanic acid methoxymethyl ester (99 mg.) is obtained.

In NMR and IR spectra, the above product is in complete agreement with the product synthesized in Example I-8, (2).

EXAMPLE I–10

7-(2-Thienylthioacetamido)-cephalosporanic acid methoxymethyl ester (2 g.) is dissolved in a mixture of acetone (18 ml.) and water (4.5 ml.), followed by the addition of sodium carbonate (480 mg.) and methyl iodide (9 ml.). The mixture is stirred for 3 hours at room temperature. The reaction mixture is concentrated and extracted with dichloromethane and the extract is washed with water, dried and concentrated. The concentrate is purified by chromatography on silica gel to obtain 7(β-(2-thienyl)-α-methylthioethylidene)amino-cephalosporanic acid methoxymethyl ester. M.P.109°–110°C (recrystallized from ether). Elementary analysis:
Calculated for C$_{19}$H$_{22}$N$_2$S$_3$O$_7$; C, 48.49; H, 4.71; N, 5.95; S, 20.44(%)
Found C, 48.45; H, 4.57; N, 5.75; S, 20.53(%)
IR(KBr disc): 1780, 1740, 1725, 1623cm$^{-1}$.
NMR(100MHz): 2.06(3H, s), 2.30(3H, s), 3.42(2H), 3.51(3H, s),
3.8–4.5(2H, m), 4.93(2H, q, J=14), 4.98(1H, d, J=5), 5.38(2H, s), 5.46(1H, d, J=5), 6.8–7.3(3H, m).

EXAMPLE I–11

A solution of 7-(5-diphenylmethoxycarbonyl-5-(phthalimido)-valeramido)-cephalosporanic acid diphenylmethyl ester(3.00 g.) in dichloromethane (10 ml.) is added dropwise, under stirring, to a mixture of dichloromethane (20 ml.), pyridine (0.56 g.) and phosphorus pentachloride (0.81 g.) which has been previously cooled to −25°C. The mixture is maintained at −15°C. to −10°C for 2 and a half hours, and then pyridine (840 mg.) is added. Hydrogen sulfide is bubbled through the mixture, which is stirred at a constant temperature of −5°C for 2 hours. Then, a solution of sodium hydrogen carbonate (670 mg.) in water (30 ml.) is added to the reaction mixture under stirring at 10°C and 10 minutes. The dichloromethane layer is separated from the aqueous layer which is then extracted twice with methylene chloride (10 ml.). The combined dichloromethane layer is washed three times with a cooled aqueous solution of sodium hydrogen carbonate and, two times with a saturated aqueous solution of sodium chloride, dried and concentrated under reduced pressure. The concentrate is chromatographed on silica gel and eluted with a mixture of dichloromethane and ether (9:1), whereupon 7-(5-phthalimido-5-diphenylmethoxycarbonylthionvaleramido)cephalosporanic acid diphenylmethyl ester (1.52 g.) is obtained. Amorphous.
IR(KBr disc): 3280, 1785, 1743, 1713cm$^{-1}$
NMR(100MHz): 1.93(3H, s), 1.73–2.72(6H, m), 3.20(2H, q(A-B pattern), J=18.5), 4.83(2H, q(A-B pattern), J=14), 4.95(1H), 5.00(1H, d, J=5), 5.98(1H, q, J=5,7), 6.86 (1H, s), 6.94(1H, s), 7.08–7.79(24H, m), 8.23(1H, d, J=7).
UV($\lambda_{max}^{CH_2Cl_2}$): 266mµ($\epsilon$=17600).

EXAMPLE I–12

In dichloromethane (50 ml.) is suspended phosphorus pentachloride (6.2 g.), and to the suspension is added pyridine (4.8 g.) under cooing with ice and stirring, followed by adding dropwise a solution of 7-phenylacetamido-3-desacetoxycephalosporanic acid methylester (6.9 g.) dissolved in dichloromethane (50 ml.). The mixture is stirred under cooling with ice for 1.5 hour, and to the reaction mixture is added dropwise pyridine (1.6 g.) and then dimethyl dithiophosphate (12.8g.), followed by stirring for 3 hours. To the reaction mixture is added water, and the resulting organic layer is dried and concentrated. The concentrate is chromatographed on silica gel with a mixture of ether-chloroform (1:4). The eluate is concentrated, and to the concentrate is added ether, whereby 7-phenylthioanacetamido-3-desacetoxycephalosporanic acid methylester (6.2 g.) is obtained. M.P.172°–174°C.

EXAMPLE I-13

In dichloromethane (2 liters) is suspended phosphorus pentachloride (312 g.), and to the suspension is added pyridine (240 g.) under cooling at 0°–-5°C and stirring, followed by adding a solution of 7-phenylacetamido-3-desacetoxy-cephalosporanic acid $\beta$-methylsulfonylethylester (438 g.) dissolved in dichloromethane (2.8 liters) over 30 minutes at the same temperature. The mixture is stirred for 1.5 hour at 0°–-5°C, and to the reaction mixture is added dimethyl dithiophosphate (640 g.) while keeping the reaction temperature under 0°C, followed by stirring for 3 hours. The reaction mixture is filtered to collect the precipitates, which are washed with water to give the crystals (461 g.) of an adduct consisting of 7-phenylthionacetamido-3-desacetoxycephalosporanic acid $\beta$-methylsulfonylethylester, pyridine and hydrogen chloride (1:1:1). M.P.129–137°C (decomp.).
Elementary analysis:
Calculated for $C_{24}H_{28}O_5N_3S_3Cl$; C,50.56; H,4.95; N,7.35; S,16.87; Cl,6.22
Found C,50.28; H,4.94; N,7.17; S,16.45; Cl,6.05
IR(KBr disc); 3160,2400,1780,1728cm$^{-1}$
NMR($d_6$-dimethylsulfoxide); 2.08(3H, s), 3.01(3H, s),3.5(4H, m), 4.02(2H), 4.53(2H, m), 5.13(1H, d;J=5), 5.90(1H, q, J=5,6), 7.1–7.5(5H), 7.9–9.0(5H), 11.14(1H, d,J=6).

Thus obtained thioacetamide adduct (5 g.) is added to ethanol (150 ml.) and the mixture is heated up to the boiling point of ethanol, followed by allowing it to cool. The precipitated crystals are collected by filtration and recrystallized from ethanol (150 ml.) to give pale yellowish needles of 7-phenylthionacetamido-3-desacetoxycephalosporanic acid $\beta$-methylsulfonylethylester (3.5 g.). M.P.142°–144°C.
Elementary analysis: Calculated for $C_{19}H_{22}O_5N_2S_3$;
C,50.20; H,4.88; N,6.16; S,21.16
Found C,50.15; H,4.88; N,6.39; S,21.38

EXAMPLE I-14

Phosphorus pentachloride (5.0 g.) is suspended in dichloromethane (100 ml.), and to the mixture is added pyridine (3.2 g.), followed by cooling at −10°C. To the resulting mixture is added 7-(2-thienylacetamido-cephalosporanic acid methoxymethylester (8.8 g.), followed by stirring for 2 hours at −10°C. To the reaction mixture is added pyridine (4.8 g.) and then dimethyl dithiophosphate (12.8 g.), followed by stirring for 3 hours. The reaction mixture is poured into water and the organic layer is separated, washed with an aqueous solution of sodium hydrogen carbonate, washed with water, dried and concentrated. The concentrate is chromatographed on silica gel to give 7-(2-thienylthionacetamido)-cephalospranic acid methoxymethylester (6.0 g.). Amorphous.
NMR(100MH$_3$): 2.05(3H, s), 3.40(2H, d, J=9), 3.48(3H, s),
4.29(2H, s), 4.94(2H, q, J=14), 5.04(1H, d, J=6), 5.33(2H, s), 6.10(1H, q, J=6), 6.90–7.27(3H, m), 8.10(1H, d, J=8).

EXAMPLE I-15

Phosphorus pentachloride (1.9 g.) is suspended in dichloromethane (50 ml.) and the mixture is cooled at −20°C, followed by addition of pyridine (1.4 g.).
To the mixture is added dropwise a solution of 7-[5-methoxymethyleneoxycarbonyl-5-(phthalimido)-valeramido]-cephalosporanic acid methoxymethylester (3.85 g.) dissolved in dichloromethane (20 ml.) at the same temperature, followed by stirring for one hour. To the reaction mixture is added pyridine (0.5 g.). The mixture is cooled at −20°C and dimethyl dithiophosphate (3.8 g.) is added dropwise, followed by stirring for 3 hours. The reaction mixture is poured into water and the organic layer is separated, washed with an aqueous solution of sodium hyrdogen carbonate, washed with water, dried and concentrated. The concentrate is chromatographed on silica gel to give 7-[5-methoxymethylenoxycarbonyl-5-(phthalimido)-thionvaleramido]-cephalosporanic acid methoxymethylester (3.4 g.). Amorphous.
IR(KBr disc); 3310, 1783, 1742, 1713cm$^{-1}$.
NMR; 1.43–3.04(6H, m), 1.97(3H, s), 3.34(3H, s), 3.34(2H,
q(A-B pattern), J=18), 3.47(3H, s), 4.64–5.20(4H, m), 5.21(2H, s), 5.35(2H, m), 6.03(1H, q, J=5,6), 7.75 (4H, m), 8.58(1H, d, J=6).

EXAMPLE I-16

Phosphorus pentachloride (62 g.) is suspended in dichloromethane (500 ml.) and to the suspension is added pyridine (48 g.) under cooling at −10°C with stirring, followed by addition of a solution of 7-phenylacetamido-3-desacetoxycephalosporanic acid $\beta$-methylsulfonylethylester (88 g.) dissolved in dichloromethane (500 ml.) over 30 minutes at the same temperature. The mixture is further stirred for 1.5 hour at −10°C, and then to the mixture is added pyridine (16 g.). Hydrogen sulfide (17 g.) is bubbled through the reaction mixture, which is further stirred for 3 hours. The precipitate crystals are collected by filtration and washed with a small volume of dichloromethane to give crystals (92 g.) of an adduct consisting of 7-phenylthioacetamido-3-desacetoxycephalosporanic acid $\beta$-methylsulfonylethylester, pyridine and hydrogen chloride (1:1:1).

EXAMPLE I-17

Phosphorus pentachloride (31.2 g.) is suspended in dichloromethane (400 ml.), followed by the addition of pyridine (24.0 g.) at −10°C. To this solution, a solution of 7-phenylacetamido-3-desacetoxycephalosporanic acid $\beta$-methylsulfonylethyl ester (43.8 g.) dissolved in dichloromethane (350 ml.) is added at the above temperature. After addition, stirring is continued further for one and half an hour at −10°C, and pyridine (8g.) is added to the solution. Then, thiacetamide(15.0 g.) is added for half an hour. After further stirring for 3 hours at −10°– −5°C, the precipitated crystals are collected by filtration and washed with dichloromethane. Yield: 48.0 g.

This product is in complate agreement with that obtained in Example I-16 in IR spectrum.

EXAMPLE I-18

7-Phenylthionacetamido-3-desacetoxycephalosporanic acid β-methylsulfonylethyl ester (1.1 g.) ethyl iodide (1.0 g.) and potassium carbonate (0.7 g.) are added to a mixture of acetone (30 ml.) and water (10 ml.). After stirring for 6 hours at room temperature, the solvent is distilled off under reduced pressure and the residue is extracted with dichloromethane. The extract is washed with water and dried. The solvent is then distilled off and the residue is purified by chromatography on silica gel eluted with dichloromethane-ethyl acetate (3:7). Principal product is recrystallized from dichloromethane-ether, whereupon 7-(α-ethylthiophenethylidene)amino-3-desacetoxy-cephalosporanic acid β-methylsulfonylethyl ester is obtained (650 mg.). M.P.68°C.

EXAMPLE I-19

7-(D-5-Phthalimido-5-diphenylmethoxyccarbonylthionvaleramido-cephalosporanic acid diphenylmethyl ester (1.50 g.) is dissolved in 20 percent aqueous acetone (20 ml.) and, then, a solution of anhyhdrous sodium carbonate (370 mg.) and methyl iodide (990 mg.) in acetone (10 ml.) is added dropwise. The mixture is stirred at room temperature for 4 hours, then the reaction mixture is concentrated under reduced pressure. The residue is dissolved in dichloromethane (30 ml.) and the solution is washed twice with a saturated aqueous solution with sodium chloride (10 ml.). The organic layer is dried and concentrated under reduced pressure. The concentration is chromatographed on silica gel and eluted with a mixture of dichloromethane and ether (97.3), whereupon 7-(D5-phthalimido-5-diphenylmethoxycarbonyl-1-methylthiopentylidene)aminocephalosporanic acid diphenylmethyl ester (1.4 g.) is obtained. Amorphous.

IR(KBr disc): 1783, 1713, 1610cm$^{-1}$.
NMR(100MHz): 1.97(3H, s), 2.24(3H, s), 1.5-2.8(6H, m), 3.37
(2H, q(A-B pattern), J=16), 4.82(2H, q(A-B pattern), J=14), approx. 4.95(1H), 5.00(1H, d, J=5), 5.37(1H, d, J=5), 6.87(1H, s), 6.94(1H, s), 7.19-7.85(24H, m).

II. Preparation of the acylamino compounds.

EXAMPLE II-1

Methanol (20 ml.) is added to a mixture of 7-(α-methylthiophenethylidene)amino-3-desacetoxycephalosporanic acid methyl ester (752 mg.) and D-camphor-10-sulfonic acid (510 mg.). The mixture is stirred at room temperature for 40 minutes, at the end of the which time the methanol is distilled off under reduced pressure. The residue is dissolved in dichloromethane and the solution is basified with an aqueous solution of sodium hydrogen carbonate, washed with water, dried and concentrated to dryness. The concentrate is recrystallized from dichloromethane-ether to obtain 7-amino-3-desacetoxycephalosporanic acid methyl ester (353 mg.). M.P.126°–128°C.

IR(KBr disc): 1770, 1710, 1632cm$^{-1}$
NMR(60MHz): 1.82(2H, s), 2.11(3H, s), 3.36(2H), 3.82(3H, s),
4.72(1H, d, J=5), 4.93(1H, d, J=5).

EXAMPLE II-2

1. 7-Phenylthionacetamido-3-desacetoxycephalosporanic acid β-methylsulfonylethyl ester (454 mg.), sodium carbonate (106 mg.) and methyl iodide (1 ml. and the solution in a mixture of acetone (5 ml.) and water (1 ml.), and the solution is stirred at room temperature for three and a half hours. The solvent is distilled off under reduced pressure and the residue is extracted with ethyl acetate.

2. After the extract is washed with water and dried, the solvent is distilled off under reduced pressure. A solution of D-camphor-10-sulfonic acid (232 mg.) in anhydrous ethanol (10 ml.) is added to the residue. The mixture is stirred at room temperature for 1 hour, and then the ethanol is distilled off under reduced pressure. Water (10 ml.) is added to the residue and under stirring and cooling with ice, 0.5N-sodium hydroxide is added to the aqueous solution until the pH will not drop below 12. At this pH, the mixture is maintained for 2 minutes. It is then brought to pH 7 with dilute hydrochloric acid, washed twice with chloroform and readjusted to pH 3.5 with dilute hydrochloric acid. Then, ethyl ether (5 ml.) is added and the mixture is allowed to stand for 30 minutes at a room temperature. The crystals formed thereupon are recovered by filtration, washed thoroughly with chloroform and acetone and dried in a desiccator. The procedure yields 121 mg. of crystals. The mother liquor is allowed to stand at 0°C overnight to obtain an additional amount (29 mg.) of crystals. In infrared absorption speectrum, these crystals are in complete agreement with a sample of 7-amino-3-desacetoxycephalosporanic acid which has been synthesized by a different route.

EXAMPLE II-3

7-(α-Methylthiophenethylidene)amino-3-desacetoxycephalosporanic acid methyl ester (376 mg.) and phenoxyacetyl chloride (190 mg.) are dissolved in dichloromethane (10 ml.), followed by the addition of 1N-hydrochloric acid (1 ml.). The mixture is stirred at room temperature for an hour. The organic layer is washed with an aqueous solution of sodium hydrogen carbonate and with water, dried and concentrated. The product is crystallized from methanol to obtain 7-phenoxyacetamido-3-desacetoxycephalosporanic acid methyl ester (307 mg.). M.P. 141°–142°C.

IR(KBr disc): 1776, 1725, 1670cm$^{-1}$
NMR(60MHz): 2.14(3H), 3.15(1H, J=18), 3.55(1H, J=18), 3.83 (3H), 4.58(2H), 5.00(1H, d, J=5), 5.84(1H, J=5,9), 6.84-7.55(6H).

Example II-4

7-(α-Methylthiophenethylidene)amino-3-desacetoxycephalosporanic acid methyl ester (376 mg.) and p-nitrobenzoyl chloride (200 mg.) are dissolved in dichloromethane (10 ml.), followed by the addition of 1/10N-hydrochloric acid (10 ml.). The solution is stirred at room temperature for 2 hours.

Crystals deposited from the solution are filtrated and washed with a small amount of dichloromethane. The procedure yields 7-(p-nitrobenzoylamido)-3-desacetoxycephalosporanic acid methyl ester (281 mg.). M.P. 263°C.

IR(KBr disc): 3260, 1780, 1715, 1650, 1530cm$^{-1}$

Example II-5

7-(α-Methylthiophenethylidene)amino-3-desacetoxycephalosporanic acid methyl ester (188 mg.) and D-N-(β-methylsulfonylethoxycarbonyl)-phenylglycyl chloride (192 mg.) are dissolved in dichloromethane (2 ml.), followed by the addition of water (5 ml.) containing sodium hydrogen carbonate (58 mg.). The mixture is stirred at room temperature for 15 hours. The organic layer is washed with water, dried and concentrated. The concentrate is chromatographed on silica gel and eluted with ethyl acetate to afford, 7-(D-N-(β-methylsulfonylethoxycarbonyl)phenylglycylamido)-3-desacetoxycephalosporanic acid methyl ester. (174 mg.), recrystallized from acetone). M.P.248°–251°C.
IR(KBr disc): 3325, 1769, 1720, 1689, 1663, 1545cm$^{-1}$
NMR(60MHz)(d$_6$-dimethylsulfoxide); 1.98(3H), 3.02(3H), 3.39
 (4H, m), 3.73(3H), 4.31(2H, m), 4.97(1H, d, J=5), 5.53 (2H, m), 7.3(5H), 9.01(1H, d, J=9), 10.16(1H, d, J=8)

Example II-6

1. 7-(α-Methylthiophenethylidene)amino-3-desacetoxycephalosporanic acid β-methylsulfonylethyl ester (740 mg.) and D-(N-(β-methylsulfonylethoxycarbonyl)phenylglycyl chloride (765 mg.) are dissolved in dichloromethane (20 ml.), followed by the addition of water (2 ml.). The mixture is stirred at room temperature for 5 hours. The mixture is washed with a solution of sodium hydrogen carbonate and with water, dried and concentrated. The concentrate is chromatographed on silica gel and eluted with ethyl acetate to afford 7-[D-N-(β-methylsulfonylethoxycarbonyl)phenylglycylamido]-3-desacetoxycephalosporanic acid β-methylsulfonylethyl ester (728 mg.).
IR(KBr disc): 1778, 1727, 1695, 1665, 1535cm$^{-1}$
NMR(100MHz)(d$_6$-dimethylsulfoxide): 2.04(3H), 2.97(6H), 3.40
 (6H), 4.42(4H), 5.13(1H, d, J=5), 5.46(2H, m), 7.3(5H), 7.95(1H), 9.16(1H).

2. The 7- D-(N-(β-methylsulfonylethoxycarbonyl))-phenylglycylamido -3-desacetoxycephalosporanic acid β-methylsulfonylethyl ester obtained above (1) (301 mg.) is dissolved in a mixture of tetrahydrofuran (5 ml.) and water (5 ml.), under stirring and cooling with ice to 10°C, then 1N-sodium hydroxide (1ml.) is added dropwise. After the dropwise addition has been completed, the mixture is stirred for 30 minutes and then adjusted to pH 7 with dilute hydrochloric acid. The tetrahydrofuran is distilled off under reduced pressure and the aqueous residual solution is brought to pH 4.5 with dilute hydrochloric acid. After allowing the solution to cool at 0°C for 2 hours, the crystals which separate out are recovered by filtration. The product is washed with a small volume of water and dried in a desiccator to afford 7-D-phenylglycylamido-3-desacetoxycephalosporanic acid (136 mg.). In IR absorption spectrum, this product is in complete agreement with an authentic sample of 7-D-phenylglycylamido-3-desacetoxycephalosporanic acid.

Example II-7

7-(α-Methylthiophenethylidene)amino-3-desacetoxycephalosporanic acid β-methylsulfonylethyl ester (468 mg.) and p-nitrophenylacetyl chloride (220 mg.) are dissolved in dichloromethane (20 ml.), followed by the addition of 1N-hydrochloric acid (1 ml.). The mixture is stirred at room temperature for 2 hours. The organic layer is washed with a solution of sodium hydrogen carbonate and with water and then the solvent is distilled off under reduced pressure. The residue is chromatographed on silica gel and eluted with ethyl acetate to afford 7-(p-nitrophenylacetamido)-3-desacetoxycephalosporanic acid β-methylsulfonylethyl ester (4.05 mg., recrystallied from methanol). M.P.220°–222°C. IR(KBr disc): 3300, 1778, 1720, 1660, 1520cm$^{-1}$
NMR(60MHz)(d$_6$-dimethylsulfoxide): 2.10(3H), 3.00(3H), 3.50
 (4H), 3.72(2H), 4.52(2H), 5.06(1H), 5.61(1H), 7.54(2H), 8.17(2H), 9.10(1H).

Example II-8

Acetone (5ml.) is added to a mixture of 7-(α-methylthiophenethylidene)amino-3-desacetoxycephalosporanic acid β-methylsulfonylethyl ester (468 mg.) and D-phenylglycyl chloride hydrochloride (230 mg.), followed by the addition of water (0.5 ml.). The mixture is stirred at room temperature for 6 hours, then the solvent is removed by distillation under reduced pressure. Water (2 ml.) is added to the residue and, then, the mixture is brought up to pH 12 with 0.5N-sodium hydroxide. The mixture is maintained at this pH for 2 minutes and, then, brought down to pH 7 with dilute hydrochloric acid. It is then washed twice with chloroform to remove a neutral product, and then brought down to pH 4.5 with dilute hydrochloric acid and concentrated to a small volume. The crystals separating out are recovered by filtration, whereupon 7-(D-phenylglycylamido)-3-desacetoxycephalosporanic acid (312 mg.) is obtained.
IR(Nujol): 1767, 1692, 1600cm$^{-1}$

Example II-9

1. In absolute ethanol (10 ml.) is suspended 7-[β-(2-thienyl)-α-methylthioethylidene]aminocephalosporanic acid methoxymethyl ester (470 mg.) and D-camphor-10-sulfonic acid (232 mg.). The mixture is stirred at room temperature for 1 hour, and then the solvent is concentrated under reduced pressure. To the concentrate is added water (5 ml.) and the mixture is extracted twice with ether, and the aqueous layer is made alkaline with sodium hydrogen carbonate. It is then extracted thrice with dichloromethane (10 ml each) and the combined extracts are washed with water, dried and concentrated to dryness. The procedure yields 7-aminocephalosporanic acid methoxymethyl ester (220 mg.). Amorphous.
IR(KBr, wet method): 3410, 1780, 1737cm$^{-1}$.
NMR(60MHz): 1.88(2H, s), 2.08(3H, s), 3.50(5H), 4.37–5.4(4H, m), 5.38(2H, s).

2. To 7-aminocephalosporanic acid methoxymethyl ester (70 mg.), there are added acetone (3.5 ml.), water (0.25 ml.) and sulfuric acid (7 mg.). The mixture is heated at 60°C on a water bath for 2 hours. The crystals separating out are recovered by filtration, washed with acetone and dried to yield 7-aminocephalosporanic acid (35 mg.). M.P.200°C (decomp.); IR(KBr disc): 1804, 1743cm⁻¹.

Example II-10

To 7-(D-5-phthalimido-5-diphenylmethoxycarbonyl-1-methylthiopentylidene)aminocephalosporanic acid diphenylmethyl ester (249 mg.) is added a mixture of ethanol (5 ml.), dichloromethane (1 ml.) and D-camphor-10-sulfonic acid (63.5 mg.) and the mixture is stirred at room temperature for 1.5 hour. The reaction mixture is concentrated at a low temperature under reduced pressure. To the concentrate are added dichloromethane (5 ml.), water (0.5 ml.) and sodium hydrogen carbonate (25 mg.), and the mixture is stirred for 10 minutes. Then, dichloromethane (20 ml.) and anhydrous sodium sulfate (5 g.) are added to the above solution, followed by stirring for 10 minutes. The insolubles are filtered off and the residue is washed with dichloromethane. The dichloromethane layers are pooled and concentrated under reduced pressure at room temperature. The residue is dissolved in ether (50 ml.) and the solution is extracted several times with 1N-hydrochloric acid (10 ml. each). The acidic aqueous solution is made alkaline with an aqueous solution of sodium hydrogen carbonate and extracted 5 times with dichloromethane (10 ml. each). The organic layer is washed twice with a saturated aqueous solution of sodium chloride dried and distilled under reduced pressure. The residue is chromatographed on silica gel to yield 7-aminocephalosporanic acid diphenylmethyl ester (116 mg.).
IR(KBr disc): 3410, 3350, 1780, 1730, 1631cm⁻¹
NMR(60MHz): 2.00(3H, s), 2.01(2H), 3.46(2H, q,(AB pattern), J=18.5), 4.86(4H, m), 6.98(1H, s), 7.34(10H, s).

Example II-11

In chloroform (4 ml.) is dissolved 7-(D-5-phthalimido-5-diphenylmethoxycarbonyl-1-methoxythiopentylidene)aminocephalosporanic acid diphenylmethyl ester (183 mg.), followed by the addition of phenylacetyl chloride (34 mg.) and 2N-hydrochloric acid (0.1 ml.). The mixture is stirred at room temperature for 1 hour and, after the addition of dichloromethane (10 ml.), water (10 ml.) and sodium hydrogen carbonate (50 mg.), it is further stirred for 5 minutes. The aqueous layer separated is extracted twice with dichloromethane (10 ml. each) and the organic layers are pooled, washed with a saturated aqueous solution of sodium chloride, dried over anhydrous sodium sulfate and concentrated under reduced pressure. The concentrate is chromatographed on silica gel and eluted with dichloromethane-ether (97:3). The procedure yields 7-phenylacetamidocephalosporanic acid diphenylmethyl ester as a colorless solid.
IR(KBr disc): 3320, 1786, 1736, 1674, 1531cm⁻¹.
NMR(60MHz): 1.96(3H, s), 3.37(2H, q(A-B pattern, J=18.5),
3.59(2H, s), 4.85(2H, q(A-B pattern), J=13), 4.90(1H, d, J=5), 5.82(1H, q, J=5.10), 6.55(2H, d, J=10), 7.29 (15H, m).

Example II-12

In dichloromethane (10 ml.) are dissolved 7-(α-methylthiophenethylidene)amino-3-desacetoxycephalosporanic acid methyl ester (376 mg.) and phenoxyacetyl chloride (170 mg.), followed by the addition of a solution of monosodium phosphate (312 mg.) and disodium phosphate (392 mg.) in water (6 ml.). The mixture is stirred at room temperature for 4 hours. The organic layer is washed with a solution of sodium hydrogen carbonate and with water, dried and concentrated to dryness. The concentrate is crystallized from methanol to give 7-phenoxyacetamido-3-desacetoxycephalosporanic acid methyl ester (260 mg.).

Example II-13

7-(α-methylthiophenethylidene)amino-3-desacetoxycephalosporanic acid β-methylsulfonylethyl ester (740 mg.) and D-(N-(β-methylsulfonylethoxycarbonyl))-phenylglycyl chloride (580 mg.) are dissolved in dichloromethane (10 ml.), followed by the addition of a buffer solution (50 ml. pH 6.86). The mixture is stirred at room temperature for 20 hours. The organic layer is washed with a solution of sodium hydrogen carbonate and with water, dried and concentrated. The concentrate is chromatographed on silica gel to give 7- D-(N-(β-methylsulfonylethoxycarbonyl)-phenylglycylamido) 3-desacetoxycephalosporanic acid β-methylsulfonylethyl ester (1.087g.).

Example II-14

7-(α-Methylthiophenethylidene)-amino-3-desacetoxycephalosporanic acid β-methylsulfonyl ester (464 mg.) and D-(N-(β-methylsulfonylethoxycarbonyl))-phenylglycyl chloride (320 mg.) are dissolved in acetone (10 ml.), followed by the addition of sodium hydrogen carbonate (85 mg.) and water (2 ml.).

The mixture is stirred at room temperature for 20 hours. Under reduced pressure the solvent is distilled off and the residue is extracted with dichloromethane (30 ml.). The extract is washed with water, dried and concentrated. The concentrate is purified by chromatography on silica gel by eluting with ethylacetate. The eluate is concentrated under reduced pressure to give 7-[D-N-(β-methylsulfonylethoxycarbonyl)phenylglycylamido]-3-desacetoxycephalosporanic acid β-methylsulfonylethyl ester ( 570 mg.).

Example II-15

7-(D-5-phthalimido-5-diphenylmethoxycarbonyl-1-methylthiopentylidene)-aminocephalosporanic acid diphenylmethyl ester (303 mg.) is dissolved in a wet ethyl acetate (5 ml.) with water and the solution is cooled to 0° to 5°C. Then, an ethyl acetate solution (1 ml.) of D-α-sulfophenylacetyl chloride (100 mg.) is gradually added and the mixture is stirred at the above temperature for 5 hours. The mixture is shaken twice together with a 1 percent aqueous solution of sodium hydrogen carbonate (10 ml. each). The aqueous layers are pooled, made acidic with sulfuric acid and extracted three times with ethyl acetate (30 ml.). The organic layers are combined, washed with a saturated aqueous solution of sodium chloride, dried and evaporated under reduced pressure to dryness to afford 7-D-α-sulfophenylacetamidocephalosporanic acid diphenylmethyl ester. A part (100 mg.) of this product is dissolved in a mixture of trifluoroacetic acid (1 ml.) and anisol (0.2 ml.) which has been previously cooled to −15°C, followed by stirring for 5 minutes. The reaction mixture is then stirred at room temperature for an additional 20 minutes. Then, the reaction mixture is concentrated under reduced pressure and the residue is washed with a small amount of benzene. The benzene solution is removed and a small amount of acetone is added, followed by the addition of n-hexane, whereupon precipitates are formed. The precipitates are washed with n-hexane and dried, whereupon 7-D-α-sulfophenylacetamidocephalosporanic acid is obtained.

Example II-16

The adduct compound of 7-phenylthionacetamido-3-desacetoxycephalosporanic acid β-methylsulfonylethyl ester, pyridine and hydrochloric acid (28.5 g.), obtained in Example I-16, and dimethyl sulfate (31.5 g.) are added to a mixed solution of acetonitrile (142.5 ml.) and water (28.5 ml.). Under cooling to −5°C, potassium carbonate (27.6 g.) is added slowly to this solution. After addition, stirring is continued further for one hundred minutes at 3°–5°C, and then, crushed ice (500 g.) is added to the solution and extracted with toluene three times (150, 50 and 50 ml.). Toluene layers are combined, washed with ice-cooled water (250 ml.), dried over anhydrous magnesium sulfate and filtered. Methanol (23 ml.) is added to this solution and, under cooling to 10°C, 20 percent methanol solution (23 ml.) of hydrochloric acid is added slowly and stirred. After 2 hours, toluene (100 ml.) is added and stirred further for one hour. The precipitated crystals are collected by filtration, washed with toluenemethanol (7:1)(80ml.) and dried. Thus 7-amino-3-desacetoxycephalosporanic acid β-methylsulfonylethyl ester hydrochloride (16.35 g.) is obtained.

Analytical sample is obtained by recrystallization from benzene-methanol (1:2). M.P.187°C(decomp.)
Elemental analysis for $C_{11}H_{17}N_2S_2O_5Cl$
Calcd.: C,37.02; H, 4.80; N, 7.85
Found: C,36.80; H, 4.66; N, 8.17

Example II-17

7-(α-Methylthiophenethylidene)amino-3-desacetoxycephalosporanic acid β-methylsulfonylethyl ester (4.7 g.) is dissolved in a mixture of acetone (50 ml.) and water (5 ml.).

Under stirring and cooling to −5°C, phenylglycyl chloride hydrochloride (2.3 g.) and disodium phosphate (twelve hydrate, 4.0 g.) are added portionwise over 5 hours, followed by stirring further 3 hours. The reaction mixture is concentrated, and to the residue is added a 1 percent aqueous solution (30 ml.) of hydrogen chloride. The mixture is extracted with dichloromethane.

This acidic solution is then brought up to pH 12 by the addition of 2N-NaOH under cooling and kept at the pH for five minutes. Then, the pH is lowered to 4.5 by 2N-hydrochloric acid. The solution is allowed to stand at 0°C. The precipitated crystals are collected by filtration. This product (2.3 g.) is in complete agreement with an authentic sample of 7-phenylglycylamino-3-desacetoxycephalosporanic acid.

Example II-18

To a mixture of 7-(D-5′-phthalimido-5′-methoxymethylene-oxycarbonyl-1′-methylthiopentylidene)-aminocephalosporanic acid methoxymethylester (20 g.), potassium hydrogen carbonate (3.2 g.), dichloromethane (100 ml.) and water (50 ml.) is added a solution of 2-thienylacetylchloride (5.1 g.) in dichloromethane (20 ml.) under stirring at −5°C. The whole mixture is stirred for 10 hours. The reaction mixture is evaporated to dryness under reduced pressure and the residue is taken up in dichloromethane.

The organic layer is washed with water, dried over sodium sulfate, and filtered, and the filtrate is evaporated to dryness under reduced pressure. The residue is chromatographed on silica gel. Elution with dichloromethane gives methyl 5-methoxymethylenoxycarbonyl-5-phthalimidothiovalerate (8.35g.). Further elution with a mixture of dichloromethane: ether (3:1) gives methoxymethyl 7-(2′-thienylacetamido)cephalosporanate (11.3 g.). M.P.164–154°C.
IR(KBr disc): 1785, 1750, 1722, 1650, 1535cm$^{-1}$.
NMR($d_6$-DMSO): 2.00(3H), 3.41(3H), 3.60(2H), 3.75(2H), 4.88
(2H, q, J=14Hz), 5.10(1H, d, J=5Hz), 5.35(2H), 5.74 (1H, q, J=5Hz and 8Hz), 6.91(2H), 7.30(1H), 9.10(1H, d, J=8Hz).

Example II-19

Methoxymethyl 7-(2′-thienylacetamido)cephalosporanate(4.4Og.) in 95 percent aqueous acetone (100 ml.) containing sulfuric acid (0.37g.) is refluxed for 2 hours.

After the reaction, the solvent is evaporated to dryness under reduced pressure. The residue is crystallized from a mixture of acetone-ether to give 7-(2′-thienylacetamido)-cephalosporanic acid (3.72 g.) M.P.150°–151°C(decomp.).

Example II-20

To a solution of 7-(α-methylthiophenethylidene)amino 3-desacetoxycephalosporanic acid β-methylsulfonylethylester (5.70g.) in 90 percent aqueous acetonitrile (100 ml.) is slowly added a solution of D-1-cyclohexenylglycylchloride hydrochloride (2.30 g.) in dichloromethane (20 ml.) at −5°C under stirring. After the addition, the mixture is stirred for 5 hours at the same conditions. The reaction mixture is concentrated under reduced pressure, and to the concentrate is added water (50 ml.). The aqueous mixture is extracted with dichloromethane. The aqueous layer is brought up to pH 12 with a 2N aqueous sodium hydroxide solution. The solution is kept at pH 12 for 5 minutes and then is brought down to pH 5.5, which is the isoelectric point of the product, to afford crystalline 7-(D-1′-cyclohexenyl glycylamido)-3-desacetoxycephalosporanic acid (3.42 g.). M.P. 190°C (decomp.)
NMR (DCl in $D_2O$) : 1.6–2.4(8H,m), 2.28(3H,S) 3.64(2H,q(AB pattern)
J=20), 4.76(1H,s), 5,26(1H,d,J=6), 5,80(1H,d,J=6), 6.28(1H,m)
IR(KBr disc) : 1760, 1680cm$^{-1}$
Elemental Analysis for $C_{16} H_{21} N_3O_4 S\ 2H_2O$
Calcd : C,49.59, H,6.50 N,10.84
Found : C,50.00, H,6.08 N,10.79

What we claim is:
1. 7-Phenylthionacetamido-3-desacetoxycephalosporanic acid β-methylsulfonylethyl ester.
2. 7-Phenylthionacetamido-3-desacetoxycephalosporanic acid methoxymethyl ester.

3. 7-(α-methylthiophenethylidene)amino-3-desacetoxycephalosporanic acid β-methylsulfonylethyl ester.

4. 7-(α-methylthiophenethylidene)amino-3-desacetoxycephalosporanic acid methoxymethyl ester.

5. An adduct consisting of 7-phenylthioacetamido-3-desacetoxycephalosporanic acid β-methylsulfonylethyl ester, hydrogen chloride and pyridine (1:1:1), having infrared absorption spectra (KBr disc) at 3160, 2400, 1780 and 1728 cm$^{-1}$ and a melting point of 129° to 137°C (decomp).

* * * * *